Dec. 17, 1935.  R. M. SMITH  2,024,706
SHORT CIRCUIT DETECTOR RELAY
Filed April 24, 1934
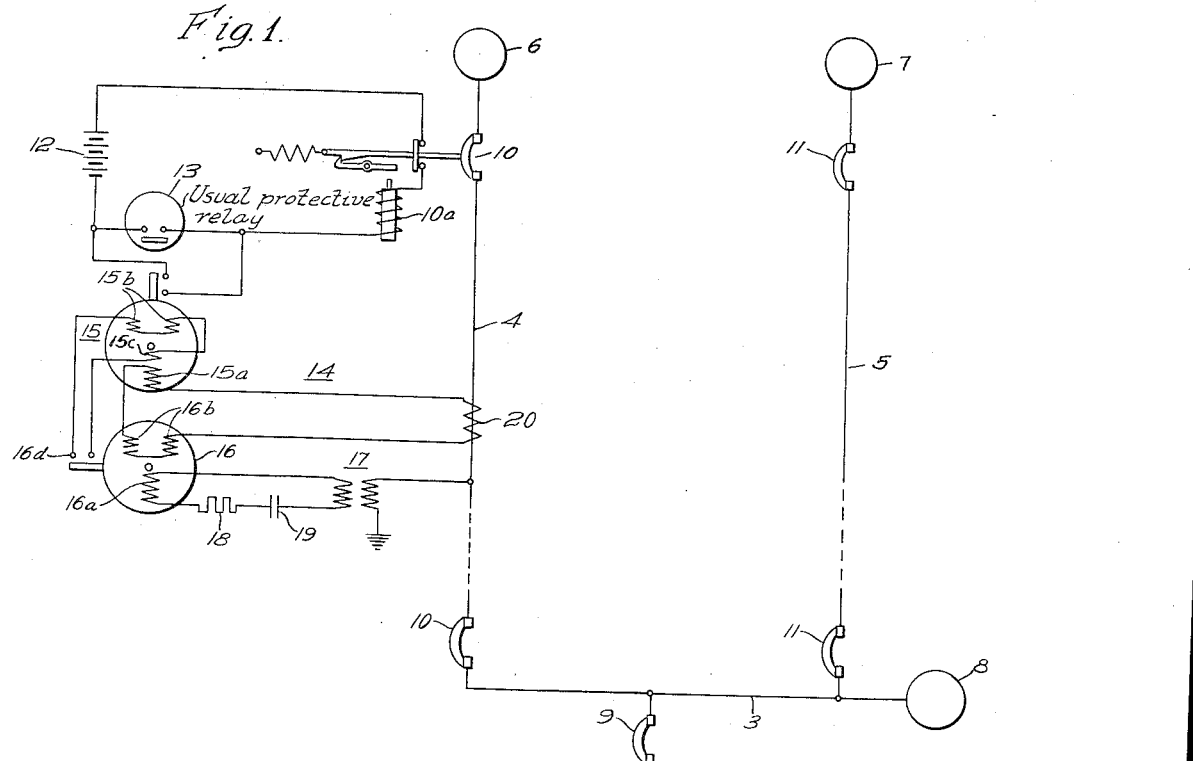
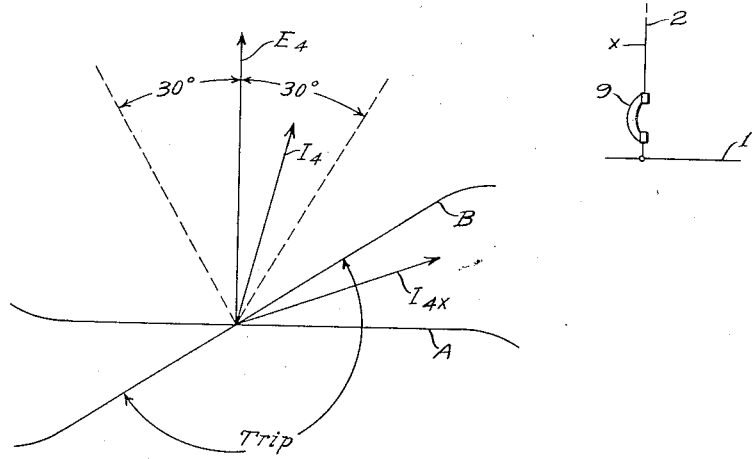
WITNESSES:
C. J. Weller.
Geo. O. Harrison.
INVENTOR
Roy M. Smith.
BY
ATTORNEY Patented Dec. 17, 1935

2,024,706

UNITED STATES PATENT OFFICE 2,024,706

SHORT CIRCUIT DETECTOR RELAY

Roy M. Smith, North Arlington, N. J., assignor to Westinghouse Electric & Manufacturing Company, East Pittsburgh, Pa., a corporation of Pennsylvania Application April 24, 1934, Serial No. 722,093

9 Claims. (Cl. 175—294)

My invention relates to protective apparatus for transmission and distribution systems and particularly to fault responsive relays for use in such systems.

Although not limited thereto, my invention is particularly applicable to alternating-current power systems in which synchronous machinery is operated in such manner as to correct the power factor on one or more circuits of the system. As examples of the class of systems to which my invention is applicable, may be mentioned sectionalized transmission systems having synchronous apparatus connected to a bus between sections, and in general to ring, radial or network transmission or distribution systems having a circuit connected at both ends to separate synchronous machines, one or more of which is operated in such manner as to correct the power factor of the circuit.

In systems of the type indicated above, the detection of faults on remote parts of the system by means of electrical quantities taken from the circuits on which the power factor is normally corrected, cannot be accomplished with certainty by the usual methods, as the voltages and currents of these circuits may remain within normal limits during such faults. However at the instant of fault, all synchronous machines, whether motors or generators, become generators, and a re-distribution of reactive currents occurs such that the power factor in the normally corrected circuits falls from a value in the neighborhood of unity to a value determined substantially by impedance phase angles, e. g., of the order of 40 to 50%.

It is an object of my invention to provide a novel relay which shall respond to the change of phase angle resulting under the conditions stated above.

Another object of my invention is to provide a novel relay comprising a directional element, having a rotated characteristic, and an over-current element.

Other objects of my invention will become evident from the following detailed description taken in conjunction with the accompanying drawing, in which Figure 1 is a single-line diagrammatic view of a transmission system in which a relay embodying my invention is utilized.

Fig. 2 is a vector diagram illustrating the operation of the relay shown in Fig. 1.

Referring to Fig. 1 of the drawing in detail, a load bus 1 is connected by means of a transmission line 2 to an intermediate bus 3 which is supplied by means of transmission lines 4 and 5 from generators 6 and 7 respectively. The intermediate bus 3 is also supplied by other generating capacity denoted generally as an equivalent generator 8. It will be understood that the equivalent generator 8 may consist of one or more synchronous machines such as generators or synchronous condensers, capable of supplying power to the bus 3 in the event of a fault. For simplicity it will be assumed that the equivalent generator 8 is a single over-excited synchronous motor.

The transmission lines 2, 4 and 5 are provided with circuit breakers 9, 10 and 11 respectively, at each end, controlled by means of protective relay apparatus of a type indicated diagrammatically in connection with the upper circuit breaker 10. Referring to this circuit breaker, the trip coil 10a thereof is arranged to be connected to a suitable source of tripping current such as a storage battery 12, by means of either of a pair of relays 13 or 14. The relay 13, as shown diagrammatically, is the usual relay arrangement for clearing faults on the transmission line 4, and may be of any of the well known types such as over-current, high-speed impedance or reactance. The construction and operation of such relays are familiar to those skilled in the art, and a detailed description and illustration of the relay 11 have accordingly been omitted.

The relay 14, which is the device of the present invention, comprises an overcurrent element 15, shown diagrammatically as of the induction disc type and a directional element 16 also shown as of the induction disc type. These elements, of course, may alternatively be of other constructions known in the art.

The overcurrent element 15 is provided with a lower pole winding 15a and with a pair of quadrature windings 15b controlled by the directional element 16 and energized from the lower pole winding 15a in any suitable manner. In the arrangement shown, the quadrature windings 15b are connected in a local circuit with an auxiliary winding 15c and the contacts 16d of the directional element 16. The auxiliary winding 15c is inductively coupled to the lower pole winding 15a through the lower pole of the relay magnetic core (not shown) in a manner well understood in the art.

The directional element 16 is provided with a potential winding 16a which is connected to a potential transformer 17 in series with a resistor 18 and a condenser 19. The directional element 16 is also provided with a pair of current windings 16b, connected in series with the lower pole winding 15a and the secondary winding of a current transformer 20.

The purpose of the resistor 18 and condenser 19 is to change the impedance phase angle of the circuit of the potential coil 16a from the usual value of almost 90° lag to a value of about 50° lead, depending upon the constants of the protected circuit. The effect of this change of impedance phase angle is to rotate the relay tripping curve in the manner indicated in Fig. 2.

Referring to Fig. 2, the voltage of the transmission line 4 at the upper circuit breaker 10 is denoted by the vector E4. A so-called "watt" tripping characteristic of an induction relay is indicated by the curve A, and the rotated characteristic of the directional element 16 is indicated at B. The curves A and B are conventional tripping curves showing the limiting locus of current values in the transmission line 4 which will effect closure of the contacts of a "watt" relay and of the directional element 16 respectively. Any current vector terminating above the curve B, such as the vector I4, produces an opening torque in the directional element 16, and any vector terminating below the curve B, such as the vector I4x, effects closure of the contacts 16b.

The overcurrent element 15 and the directional element 16 are provided with various adjusting devices (not shown), familiar to those skilled in the art. The overcurrent element 15 is adjusted to close its contacts in response to a comparatively small current value, for example 80% of the full load current of the transmission line 4, and with a time delay greater than that of the relay 13. For example if the maximum time of operation of the relay for a fault on the line 4 is .2 second, the overcurrent element 15 may be set to close with a definite time delay of .5 second. The directional element is preferably adjusted to operate substantially instantaneously.

The operation of the above described apparatus may be set forth as follows: During normal operation of the system, the over-excited motor 8 is regulated manually or by means of automatic regulating apparatus (not shown) in such manner as to supply most of the reactive power consumed by the load connected to bus 1. Assuming that a power factor of 87% or higher is maintained on the transmission line 2, the current in the latter line may be represented by the vector I4 of Fig. 2, which normally remains within a 30° range of the voltage E4.

If a fault occurs on the transmission line 2, as at point x, the relay apparatus (corresponding to the relay 13) for the upper circuit breaker 9 operates to cause the latter circuit breaker to open within a time interval of .2 second after the fault. If the load bus 1 is tied to other power circuits (not shown), the lower circuit breaker 9 also opens under these conditions.

However, if for any reason the upper circuit breaker 9 fails to open, an operation of the relay 14 is brought about in the following manner: Upon the occurrence of the fault at x, the impedance drop due to impedance of the load on the bus 1 becomes zero and the voltage of the intermediate bus 3 immediately drops to a lower value, which may be, for example, 60 to 90% of normal. As the generated voltage of the motor 8 is sustained by the inertia of its rotor, but its terminal voltage is reduced, the output current of the motor 8 rotates through a large phase angle from a position almost in quadrature to the voltage to a position more nearly in phase with the voltage and acting in the generating direction, because of the synchronous characteristics of the machine 8. In other words the motor 8 becomes a generator acting to supply the fault current in parallel with the generators 6 and 7. The leading reactive current normally consumed by the machine 8 accordingly disappears, and the power factor of the current in the transmission line 8 is reduced. The fault current in the circuit 2 divides vectorially among the three machines 6, 7 and 8 in a ratio determined by their generated E. M. F's. and the impedances of the various branches of the network. As the impedance phase angles of the various branches would be in practice fairly close together, the currents are more or less in phase and, in general, lagging with a power factor of the order of 40 to 50%. The current in the line 4 under these conditions may be such as represented by the vector I4x in Fig. 2.

In response to the current I4x the directional element 16 closes substantially instantaneously and the quadrature circuit of the overcurrent element 15 is completed. At the expiration of approximately .5 seconds after the fault, the overcurrent element 15 closes to trip open the upper circuit breaker 10. In this way the relay 14 operates to back up the usual relays closer to the fault.

Although I have shown my invention in diagrammatic form, it will be understood that in a practical embodiment thereof the various elements may be constructed in a manner familiar to those skilled in the art, the relays and circuits may be polyphase and various elements such as transformers and auxiliaries supplied in accordance with the usual practice.

I do not intend that the present invention shall be restricted to the specific structural details, arrangement of parts or circuit connections herein set forth, as various modifications thereof may be effected without departing from the spirit and scope of my invention. I desire therefore, that only such limitations shall be imposed as are indicated in the appended claims.

I claim as my invention:

1. In an alternating-current system including a normally lagging load, an alternating-current circuit normally traversed by power supplied to said load, a synchronous machine connected to said circuit and operable to normally prevent a current condition of said circuit from lagging a voltage condition thereof by more than a predetermined angular value, and protective apparatus for said circuit including a relay element responsive to the phase relationship of said voltage condition and said current condition, said element being effective to perform a relaying operation in response to increase of the phase-angle between said voltage condition and said current condition beyond said predetermined angular value when the power flow in said circuit is in the normal direction.

2. In an alternating-current system, alternating-current dynamo-electric apparatus, an alternating-current circuit connected to said apparatus, a synchronous machine connected to said circuit and operable to normally maintain a power factor condition of said circuit above a predetermined value, and protective apparatus for said system including a fault-responsive element operable in response to a vector product of current and voltage conditions of said circuits, said vector product having values of one sign for power factor conditions above said predetermined value and having a value of opposite sign for a power factor condition below said predetermined value.

3. In a protective relay for an alternating-current circuit, fault detecting elements comprising directional means having a rotated characteristic to respond to a change of a power factor condition of said circuit from normal to abnormal, and means responsive to a second electrical condition of said circuit.

4. In a protective relay for an alternating-current circuit, fault detecting elements comprising directional means having a rotated characteristic to respond to a change of a power factor condition of said circuit from normal to abnormal, and means responsive to an overcurrent condition of said circuit.

5. In a protective relay for an alternating-current circuit, an element responsive to a rotated vector product of a voltage condition and a current condition of said circuit, said vector product having substantially zero value when a line current condition lags a corresponding line voltage condition by a predetermined phase angle of the order of 40 to 65°.

6. In a protective relay for an alternating-current circuit, an element responsive to a rotated vector product of a voltage condition and a current condition of said circuit, said vector product having substantially zero value when a line current condition lags the corresponding line voltage condition by a predetermined phase angle of the order of 50°.

7. In a protective relay for an alternating-current circuit, an element responsive to a rotated vector product of a voltage condition and a current condition of said circuit, said vector product having substantially zero value when a line current condition lags the corresponding line voltage condition by a predetermined phase angle of the order of 40° to 65° and an overcurrent element responsive to a current condition of said circuit.

8. In a protective relay for an alternating-current circuit, a relay element responsive to the phase relationship of a voltage condition and a current condition of said circuit, said element being effective to perform a relaying operation in response to increase of the phase angle between said voltage condition and said current condition from a value within normal limits to a value approaching the impedance phase-angle of said circuit when the direction of real power flow is normal, and a second relay element responsive to a second abnormal condition of said circuit for cooperating with said first-mentioned relay element in distinguishing a fault on said circuit.

9. In a protective relay for an alternating-current circuit, a relay element responsive to the phase relationship of a voltage condition and a current condition of said circuit, said element being effective to perform a relaying operation in response to increase of the phase angle between said voltage condition and said current condition from a value within normal limits to a value approaching the impedance phase-angle of said circuit when the direction of real power flow is normal, and an overcurrent relay element responsive to an overcurrent condition of said circuit for cooperating with said first-mentioned relay element in distinguishing a fault on said circuit.

ROY M. SMITH.